United States Patent
Sloane et al.

(10) Patent No.: US 12,095,823 B2
(45) Date of Patent: Sep. 17, 2024

(54) SYSTEM AND METHOD FOR SELF-CLUSTERING EDGE COMPUTING PROTECTION

(71) Applicant: BANK OF AMERICA CORPORATION, Charlotte, NC (US)

(72) Inventors: Brandon Sloane, Indian Land, SC (US); Michael Ogrinz, Easton, CT (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 342 days.

(21) Appl. No.: 17/547,566

(22) Filed: Dec. 10, 2021

(65) Prior Publication Data
US 2023/0188573 A1 Jun. 15, 2023

(51) Int. Cl.
*H04L 9/00* (2022.01)
*H04L 9/40* (2022.01)

(52) U.S. Cl.
CPC ........ *H04L 63/205* (2013.01); *H04L 63/1416* (2013.01); *H04L 63/1425* (2013.01)

(58) Field of Classification Search
CPC .............. H04L 63/205; H04L 63/1416; H04L 63/1425; H04L 63/20
See application file for complete search history.

(56) References Cited

U.S. PATENT DOCUMENTS

| | | |
|---|---|---|
| 9,876,851 B2 | 1/2018 | Chandramouli et al. |
| 10,007,513 B2 | 6/2018 | Malladi et al. |
| 10,104,672 B2 | 10/2018 | Shah |
| 10,230,798 B2 | 3/2019 | Doraiswamy et al. |
| 10,567,495 B2 | 2/2020 | Gandhi et al. |
| 10,587,721 B2 | 3/2020 | Das et al. |
| 10,739,761 B2 | 8/2020 | Chavez et al. |
| 11,050,813 B2 | 6/2021 | Sabella et al. |
| 11,096,036 B2 | 8/2021 | Poornachandran et al. |
| 11,115,336 B2 | 9/2021 | Sabella et al. |
| 11,157,311 B2 | 10/2021 | Guim Bernat et al. |
| 11,201,784 B2 | 12/2021 | Peng et al. |
| 11,226,795 B2 | 1/2022 | Lucas et al. |
| 11,233,846 B2 | 1/2022 | Khalid |
| 2003/0221190 A1* | 11/2003 | Deshpande ............... G06F 8/61 717/176 |
| 2019/0158606 A1 | 5/2019 | Prabhakaran et al. |
| 2019/0220703 A1 | 7/2019 | Prakash et al. |
| 2019/0369984 A1 | 12/2019 | Malladi et al. |
| 2020/0167785 A1* | 5/2020 | Kursun ................. H04L 43/045 |
| 2020/0169483 A1* | 5/2020 | Kursun ............. G06Q 20/3678 |
| 2020/0267518 A1 | 8/2020 | Sabella et al. |
| 2020/0285997 A1 | 9/2020 | Bhattacharyya et al. |
| 2021/0144517 A1 | 5/2021 | Guim Bernat et al. |

* cited by examiner

Primary Examiner — Daniel B Potratz
Assistant Examiner — Syed M Ahsan
(74) Attorney, Agent, or Firm — Moore & Van Allen PLLC; Nicholas C. Russell (57) ABSTRACT

Systems, computer program products, and methods are described herein for self-clustering computing protocols. The present invention is configured to detect, using a node analysis engine, a change in a network security protocol associated with a first node or device within a distributed network, and transmit instructions for the first node or device to broadcast the change to nearby nodes or devices such that they can act in concert to protect against identifies security issues.

17 Claims, 4 Drawing Sheets

SYSTEM AND METHOD FOR SELF-CLUSTERING EDGE COMPUTING PROTECTION

FIELD OF THE INVENTION

The present invention embraces a system for dynamic node analysis for network security response.

BACKGROUND

Network security refers to a set of rules and/or configurations designed to protect the integrity, confidentiality, and accessibility of nodes within a computer network and data using both software and hardware technologies.

There is a need for a system for dynamic node analysis for network security response to determine the extent of potential exposure and to enable faster identification of potential safety problems.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Mesh frameworks allow for multiple nodes or devices in a networking environment to apply measures and take certain actions at the edge of the network as opposed to a single point of control. There is a need to apply this framework in a network security context as opposed to using a conventional, centralized network scanning tool to identify potential issues and apply changes on each node individually. The present invention may be utilized to analyze traffic patterns on each of the nodes or edge computing devices and tailor device-specific security measures in response, and broadcast such measures to adjacent nodes. The system implements traffic analysis at the node or edge device, so while data is aggregated in a centralized manner, rules may be applied at a topology level based on outlier nodes with traffic information that differs from other nodes. This is analogous to using a collection of telescopes to stitch together a comprehensive picture. Overlapping data patterns may be used to identify the degree of similarity between nodes or devices. Data from each node may be used to gather a larger picture of total network traffic information, and a collection of nodes may be programmed to act in concert with one another. For instance, similarities between nodes may lead to the nodes self-clustering as measured based on a similarity index calculation. Clustered nodes may act in concert to shift their policies and actions together to enhance the overall security of the network.

In one aspect, a system for self-clustering edge computing is presented. The system comprising: at least one non-transitory storage device; and at least one processing device coupled to the at least one non-transitory storage device, wherein the at least one processing device is configured to: detect, using a node analysis engine, a change in a network security protocol associated with a first node or device within a network environment; extract information associated with the change in the network security protocol associated with the first node or device; transmit instructions to the first node or device to broadcast the change and underlying security issue to one or more adjacent nodes or devices; determine a first set of changes to the network security protocols for the one or more adjacent nodes or devices based on device similarity and network topology distance between the first node or device and the one or more adjacent nodes or devices; and automatically implement the first set of changes to the network security protocols of the one or more adjacent nodes or devices.

In some embodiments, adjacent nodes or devices further comprise nodes or devices which are one degree of separation from the first node or device.

In some embodiments, adjacent nodes or devices further comprise nodes or devices which are the same degree of separation from public devices as the first node or device.

In some embodiments, determining the first set of changes further comprises: initiating a machine learning model on the information associated with the change in the network security protocol associated with the first node or device; classifying, using the machine learning model, the change in the network security protocol associated with the first node into one or more classes; retrieving one or more preset changes to the network security protocols associated with the one or more classes; and determining the first set of changes to the network security protocols for the one or more adjacent nodes or devices from the one or more preset changes.

In some embodiments, the first set of changes to the network security protocols of the one or more adjacent nodes or devices causes the one or more adjacent nodes or devices to begin sharing real-time data analytics information with the first node or device.

In some embodiments, the invention is further configured to implement a second set of changes on the first node or device and the adjacent nodes or devices contemporaneously based on changes in the real-time data analytics information.

In some embodiments, the invention is further configured to: identify one or more adjacent nodes or devices with a second degree of separation from the first node or device in response to detecting the change; determine a second set of changes to the network security protocols for the one or more adjacent nodes or devices with the second degree of separation from the first node or device based on at least the information associated with the change in the network security protocol of the first node or device and the first set of changes implemented to the network security protocols of the one or more adjacent nodes or devices with the first degree of separation from the first node or device; and automatically implement the second set of changes to the network security protocols of the one or more adjacent nodes or devices with the second degree of separation from the first node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate a market value of a property held by a user, including property that is stored and/or maintained by a third-party entity. For purposes of this invention, a resource is typically stored in a resource repository—a storage location where one or more resources are organized, stored, and retrieved electronically using a computing device.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

The present invention provides the functional benefit of dynamically changing the security awareness of nodes to according to the actions of nodes in their immediate vicinity (e.g., adjacent nodes). As certain nodes escalate their level of security in response to some measurable traffic pattern or network parameter calling for heightened security, the present invention detects this escalation and reacts accordingly by implementing corresponding security changes to nodes in its immediate vicinity. Thus, nodes in the immediate vicinity may implement similar policies and a "ripple effect" may occur throughout nodes which are one, two, or three degrees of separation away from the original node where the security issue was originally identified. In some cases, the level of heightened security may lessen as the degree of separation increases, so the ripple effect may lessen gradually depending on network-distance from the originally affected node. To this end, machine learning may be implemented to analyze effectiveness of heightened security awareness controls and accuracy of security indications in hindsight in order to identify which security patterns and safety implementations are most helpful.

Figure 1:
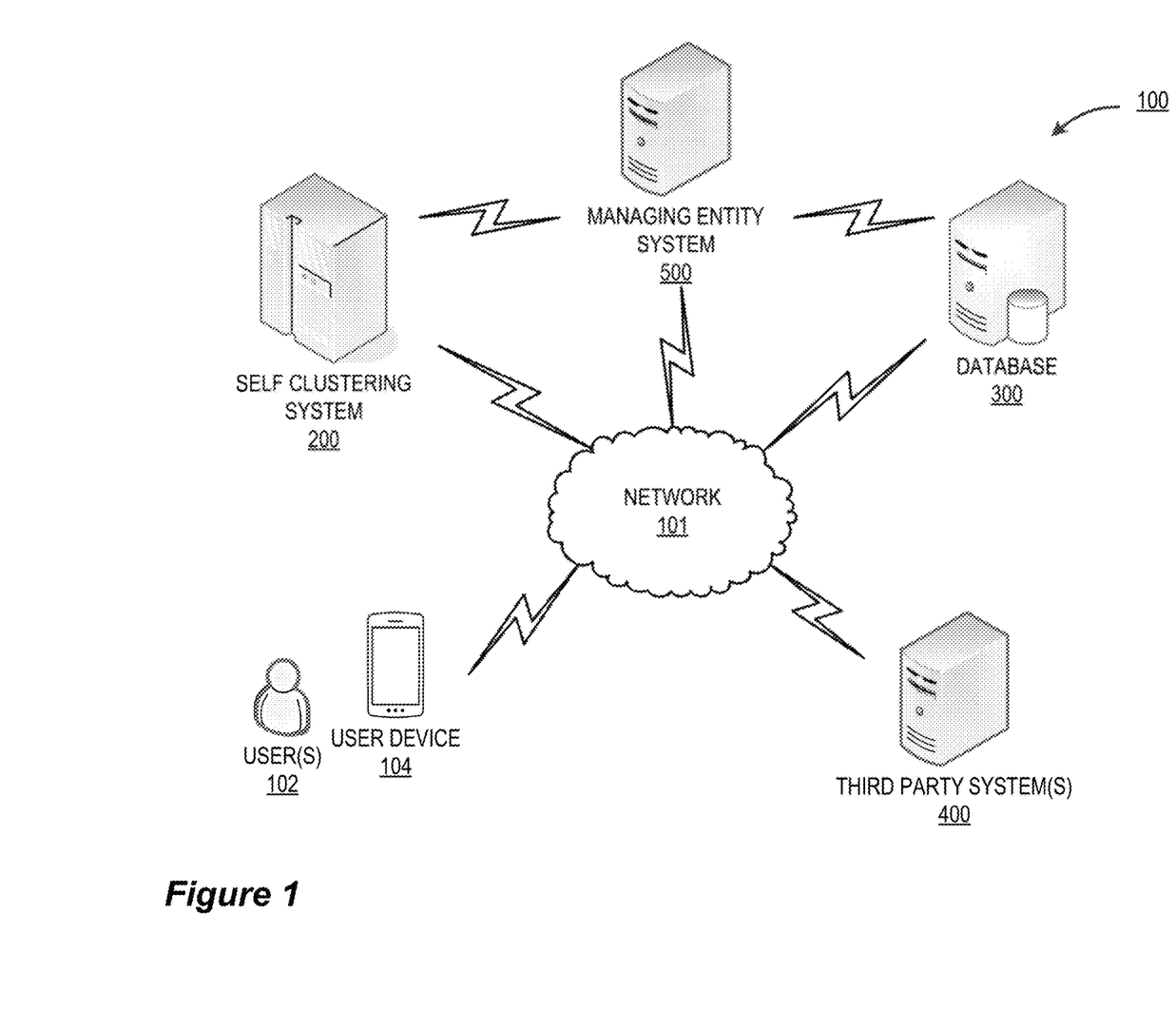
FIG. 1 illustrates an operating environment for the self-clustering system, in accordance with some embodiments of the invention.

FIG. 1 illustrates an operating environment for the self-clustering system, in accordance with one embodiment of the present disclosure. As illustrated, the operating environment 100 may comprise a user 102 and/or a user device 104 in operative communication with one or more third party systems 400 (e.g., web site hosts, registry systems, databases, third party entity systems, or the like). The operative communication may occur via a network 101 as depicted, or the user 102 may be physically present at a location separate from the various systems described, utilizing the systems remotely. The operating environment also includes a managing entity system 500, a self-clustering system 200, a database 300, and/or other systems/devices not illustrated herein and connected via a network 101. As such, the user 102 may request information from or utilize the services of the self-clustering system 200, or the third party system 400 by establishing operative communication channels between the user device 104, the managing entity system 500, and the third party system 400 via a network 101.

Typically, the self-clustering system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256 which stores user account data 257. The data repository 256 may also contain user data. This user data may be used by the managing entity to authorize or validate the identity of the user 102 for accessing the system (e.g., via a username, password, biometric security mechanism, 2 factor authentication mechanism, or the like). In some embodiments, the managing entity system is in operative communication with the self-clustering system 200 and database 300 via a private communication channel. The private communication channel may be via a network 101 or the self-clustering system 200 and database 300 may be fully integrated within the managing entity system 500, such as a virtual private network (VPN), or over a secure socket layer (SSL).

The managing entity system 500 may communicate with the self-clustering system 200 in order to transmit data by or via a plurality of third party systems 400. In some embodiments, the managing entity may utilize the features and functions of the self-clustering system to monitor potential issues on the network of devices and systems as a whole. In other embodiments, the managing entity and/or the one or more third party systems may utilize the self-clustering system via a portal or application in order to query the status of various nodes, devices, or systems, connected via the network.

In accordance with embodiments of the invention, the environment 100 is intended to represent various forms of networked computing devices, such as laptops, desktops, video recorders, audio/video player, radio, workstations, servers, wearable devices, Internet-of-things devices, electronic kiosk devices, blade servers, mainframes, or any combination of the aforementioned. In accordance with embodiments of the invention, the user device 104 is intended to represent various forms of digital computers, such as laptops, desktops, personal digital assistants, cellular telephones, and other similar computing devices. The components shown here, their connections and relationships, and their functions, are meant to be exemplary only, and are not meant to limit implementations of the inventions described and/or claimed in this document.

Figure 2:
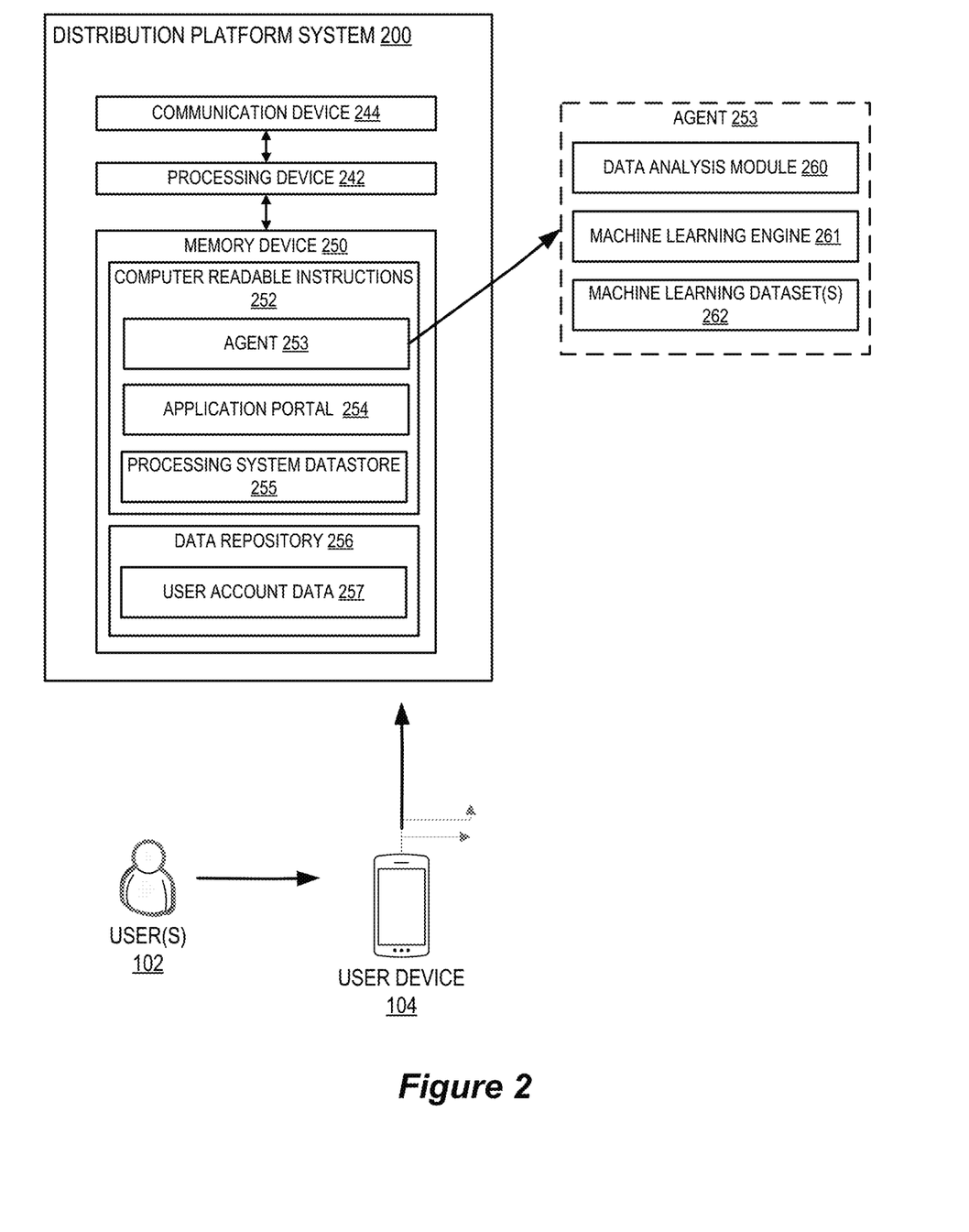
FIG. 2 is a block diagram illustrating the self-clustering system, in accordance with some embodiments of the invention.

The environment 100 may be implemented in a number of different forms, as shown in FIG. 1. For example, it may be implemented as a standard server, or multiple times in a group of such servers. Additionally, the environment 100, and the systems and devices that comprise it, may also be implemented as part of a rack server system or a personal computer such as a laptop computer. Alternatively, components from various systems and devices shown in environment 100 may be combined with one or more other same or similar systems and any of the devices or systems shown may be made up of multiple computing devices communicating with each other. In some embodiments, the self-clustering system 200 may be configured to access, via the network 101, a number of other networked computing devices (not shown) in addition to the user device 104 such as access points, routers, hubs switches, bridges, gateways, modems, repeaters, nodes, and/or the like FIG. 2 illustrates a block diagram of the self-clustering system 200 associated with the operating environment 100, in accordance with embodiments of the present invention. As illustrated in FIG. 2, the self-clustering system 200 may include a communication device 244, a processing device 242, and a memory device 250 having an agent module or "agent" 253, and a processing system datastore 255 stored therein. As shown, the processing device 242 is operatively connected to and is configured to control and cause the communication device 244, and the memory device 250 to perform one or more functions. In some embodiments, the agent module 253 comprises computer readable instructions that when executed by the processing device 242 cause the processing device 242 to perform one or more functions and/or transmit control instructions to the database 300, the managing entity system 500, various other user devices 104, or nodes on the network 101.

It is understood that the agent 253 may be executable to initiate, perform, complete, and/or facilitate one or more portions of any embodiments described and/or contemplated herein. The agent 253 may comprise executable instructions associated with data processing and analysis related to various potential indications of safety issues in the environment 100 or with the various systems, devices, or nodes connected via the network 101. In some embodiments, the agent 253 may be responsible for broadcasting security protocol changes to nearby or adjacent nodes in the self-clustering system 200. The self-clustering system 200 may comprise multiple different nodes or devices. The self-clustering system 200 may be owned by, operated by and/or affiliated with the same managing entity that owns or operates the managing entity system 500. In some embodiments, the self-clustering system 200 is fully integrated within the managing entity system 500.

The agent 253 may further comprise a data analysis module 260, a machine learning engine 261, and a machine learning dataset(s) 262. The data analysis module 260 may store instructions and/or data that may cause or enable the self-clustering system 200 to receive, store, and/or analyze data received by the managing entity system 500, the database 300, or other devices connected to the self-clustering system 200 via network 101. The data analysis module 260 may process data to identify or retrieve relevant data from other devices, nodes, or databases. For instance, the data analysis module 260 may intelligently trace a number of complex transactions, network requests, or the like, involving one or more specific user device(s) 104, or the like.

The machine learning dataset(s) 262 may contain data generated on each node or device on the network 101, or received from one or more adjacent nodes or devices. In some embodiments, the machine learning dataset(s) 262 may also contain data relating to user activity or device information, which may be stored in a user account managed by the managing entity system. In some embodiments, the agent 253 may act as a data interjector for submitting proposed data records to the database 300. In some embodiments, content initially submitted by the agent 253 may be tokenized and stored on the distributed register.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the self-clustering system 200, the user device 104, other processing systems, data systems, etc.

Additionally, the processing device 242 may generally refer to a device or combination of devices having circuitry used for implementing the communication and/or logic functions of the self-clustering system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the self-clustering system 200 may be allocated between these processing devices according to their respective capabilities. The processing device 242 may further include functionality to operate one or more software programs based on computer-executable program code 252 thereof, which may be stored in a memory device 250. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the self-clustering system 200 may generally refer to a device or combination of devices that store one or more forms of computer-readable media for storing data and/or computer-executable program code/instructions. For example, the memory device 250 may include any computer memory that provides an actual or virtual space to store data temporarily or permanently and/or commands provided to the processing device 242 when it carries out its functions described herein.

Figure 3:
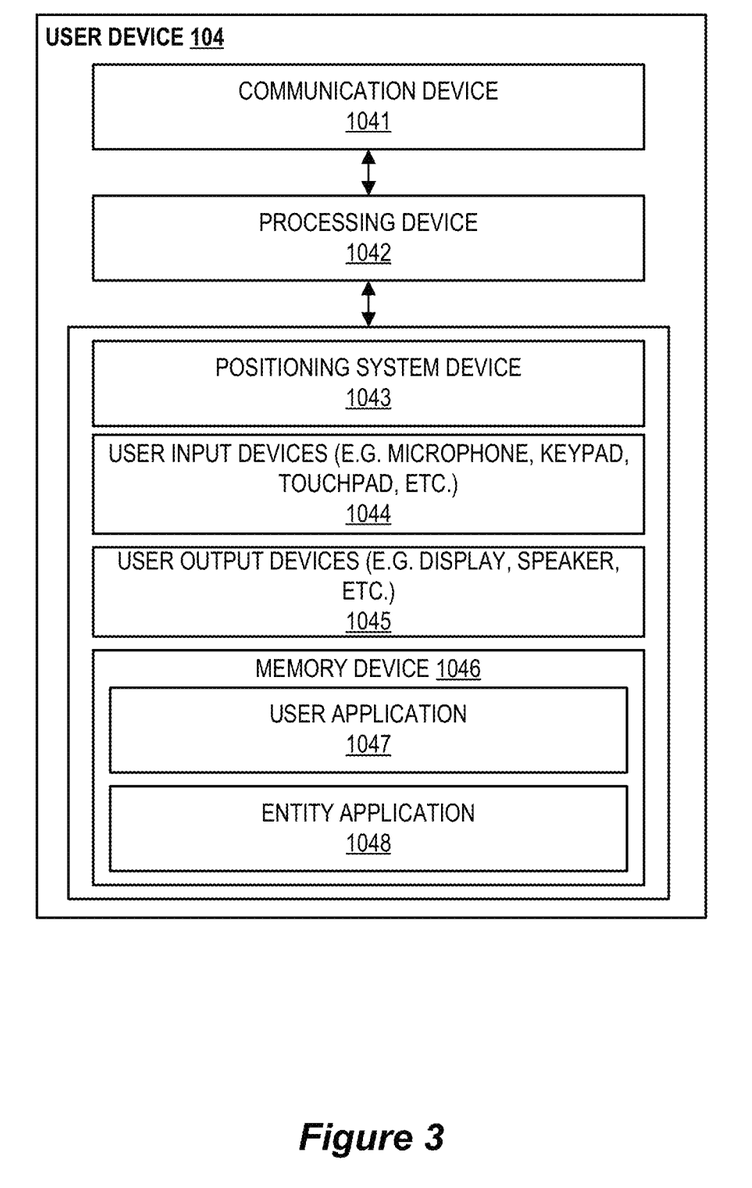
FIG. 3 is a block diagram illustrating a user device associated with the self-clustering system, in accordance with some embodiments of the invention.

FIG. 3 illustrates a block diagram of the user device associated with the self-clustering system, in accordance with embodiments of the present invention. The user device 104 may include a user mobile device, computing device, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processing device 1042 communicably coupled to devices such as, a memory device 1046, user output devices 1045 (for example, a user display or a speaker), user input devices 1044 (such as a microphone, keypad, touchpad, touch screen, and the like), a communication device or network interface device 360, a positioning system device 1043, such as a geo-positioning system device like a GPS device, an accelerometer, and the like, one or more chips, and the like.

The processing device 1042 may include functionality to operate one or more software programs or applications, which may be stored in the memory device 320. For example, the processing device 1042 may be capable of operating applications such as a user application 351, an entity application 1048, or a web browser application. The user application 351 or the entity application may then allow the user device 104 to transmit and receive data and instructions to or from the third party system 400, self-clustering system 200, and the managing entity system 500, and display received information via a graphical user interface of the user device 104. The user application 1047 may further allow the user device 104 to transmit and receive data to or from the managing entity system 500 (for example, via wireless communication or NFC channels), data and instructions to or from the self-clustering system 200, web content, such as, for example, location-based content and/or other web page content, according to a Wireless Application Protocol (WAP), Hypertext Transfer Protocol (HTTP), and/or the like. The user application 1047 may allow the managing entity 500 to present the user 102 with a plurality of recommendations, suggestions, requests, blockchain data, graph data, statistics, and/or the like.

The processing device 1042 may be configured to use the communication device 1041 to communicate with one or more devices on a network 101 such as, but not limited to the third party system 400, the self-clustering system 200, and the managing entity system 500. In this regard the processing device 1042 may be configured to provide signals to and receive signals from the communication device 1041. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 1041 may also include a user activity interface presented in user output devices 1045 in order to allow a user 102 to execute some or all of the processes described herein. The application interface may have the ability to connect to and communicate with an external data storage on a separate system within the network 101. The user output devices 1045 may include a display (e.g., a liquid crystal display (LCD) or the like) and a speaker 334 or other audio device, which are operatively coupled to the processing device 1042. The user input devices 1044, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 1046 operatively coupled to the processing device 1042. Typically, one or more applications 351 and 352, are loaded into the temporarily memory during use. As used herein, memory may include any computer readable medium configured to store data, code, or other information. The memory device 1046 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the self-clustering system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
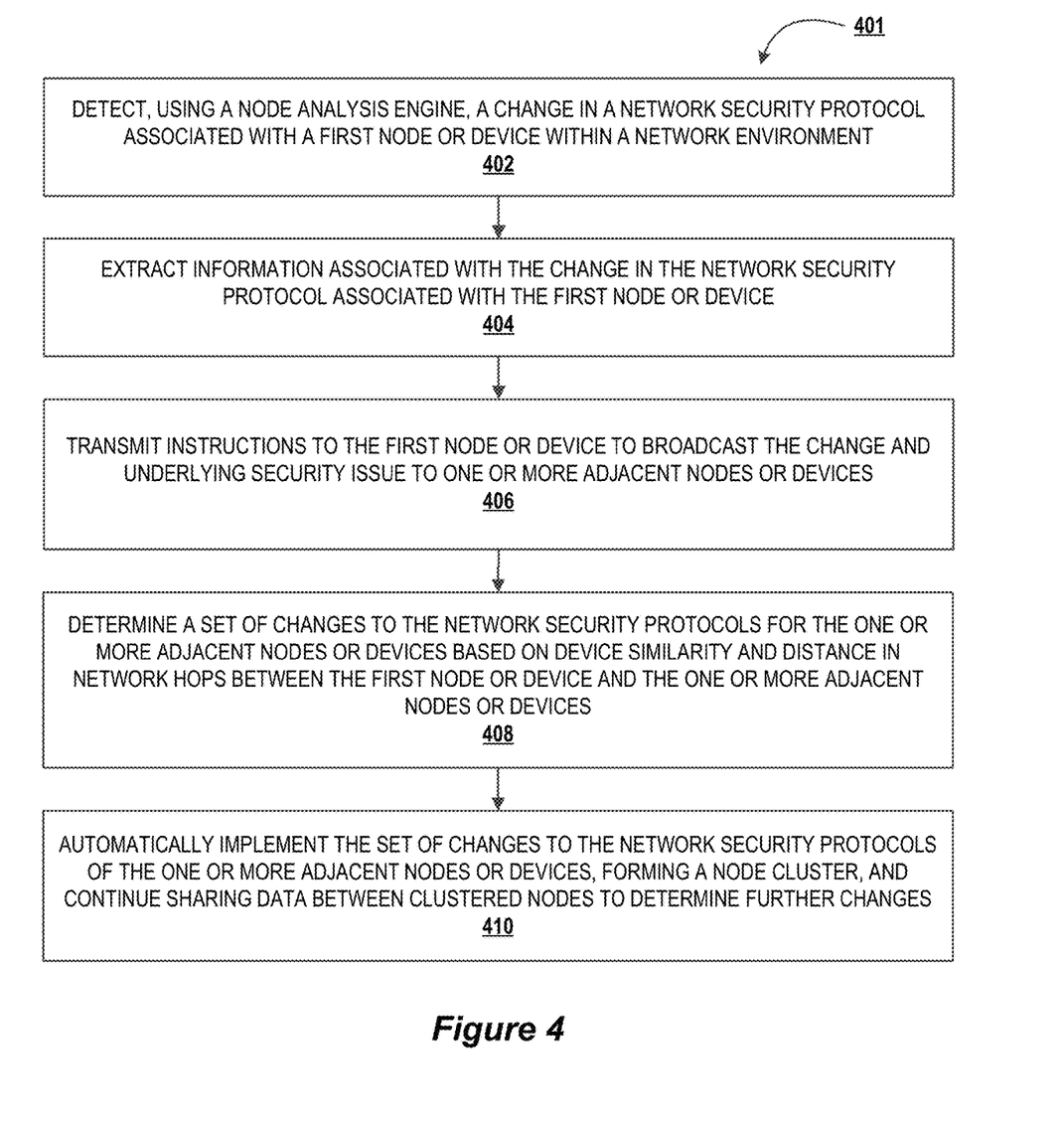
FIG. 4 is a process flow diagram illustrating network data analysis processes and response via the self-clustering system, in accordance with some embodiments of the invention.

FIG. 4 is a process flow diagram illustrating network data analysis processes and response via the self-clustering system, in accordance with some embodiments of the invention. As shown in block 402, the process flow includes detecting, using a node analysis engine, such as machine learning engine 261, a change in a network security protocol associated with a first node or device within the network environment 100. To this end, the system may be configured to continuously monitor, using the node analysis engine, the status of the network security protocols associated with the one or more nodes or devices connected via the network. In some embodiments, the network security protocol may include one or more security controls—safeguards or countermeasures to avoid, detect, counteract, or minimize security exposure to the technology infrastructure. As such, monitoring the status of the network security protocol may include monitoring the status of each security control associated with the network security protocol. In some embodiments, the security controls may include at least a device connection timeout adjustment, an authentication escalation (e.g., requiring additional or more secure authentication from a user or device connected to the self-clustering system 200, managing entity system 500, or the like), a re-authentication requirement, a bandwidth restriction adjustment, a communication technology requirement (e.g., may require connected devices or nodes to provide additional information in order to maintain a connection with the system), and/or the like.

Next, as shown in block 404, the process flow includes extracting information associated with the change in the network security protocol associated with the first node or device. In some embodiments, the information associated with the change in the network security protocol may include a change in the status of at least one corresponding security control. Each security control may be associated with a status that is based on a level of perceived exposure to security issues by that node. Each node may be configured to dynamically change the status of a security control in response to detecting specific exposure patterns.

In one example, a node may detect that an unknown device is attempting access and has failed its authentication requirement a number of times (e.g., two consecutive failures, or the like). In response, the node, which otherwise requires only a single factor authentication (initial status) may dynamically change its authorization requirement to two-factor authentication (status change). In another example, a node may detect that a person in an authorized session is downloading an unusually large amount of data. In response, the node, which may otherwise not have a session timeout requirement (initial change), may dynamically implement a session timeout, and require an authentication escalation (status change) to continue the data transfer.

In some embodiments, by capturing the information associated with the change in the status of at least one security control, the self-clustering system may be configured to determine that the change is significant enough to require a corresponding change in the status of security controls of one or more adjacent nodes in order to actively protect against the device responsible for the security issue connecting to a nearby node and executing the same behavior. In this way, the adjacent nodes are automatically instructed to alter their behavior in response to the initial security issue identification, which effectively guards against that security issue in a shorter amount of time, and protects against the possibility of one or more other user device initiating similar security issues in a concerted fashion.

Next, as shown in block 406, the process flow includes transmitting instructions to the first node or device to broadcast the change and underlying security issue to one or more adjacent nodes or devices. Depending on the network topology of the technology infrastructure, each node may be associated with a degree, i.e., number of connections or hops it has to other nearby nodes. Nodes that share an edge with another node are considered to have a first degree of separation. Nodes that are connected to each other via a shared node, where the shared node has a first degree of separation with both the nodes, are considered to have a second degree of separation, and so on. In other words, the number of edges or hops between two nodes is used to define the degree of separation between them.

An "adjacent node," with respect to the first node or device, may be defined typically as a node or device which is one degree of separation away from the first node or device; however, in some embodiments, it may further comprise a node or device positioned in the same topological degree of separation relative to the managing entity system 500, one or more third party systems 400, or one or more user devices 104. For instance, a node which is two degrees of separation from a user device 104 that is operating from a public or external network, and therefore one layer of away from public facing devices, may not be considered immediately adjacent to a first node or device which is public facing, or located at the internal network boundary. Thus, adjacent may not only be defined in terms of degrees of separation from the first node or device, but also the positioning of one or more nodes or devices in terms of areas on the environment 100 topology which are "edge devices," (i.e., devices at the edge of an internal network, and are positioned to receive data from external devices as a first-pass filter), and able to be subject to the same security issues as those identified by the first node or device.

Next, as shown in block 408, the process flow includes determining a first set of changes to the network security protocols for the one or more adjacent nodes or devices based on device similarity and the distance in network hops or degree of at least the information associated with the change in the network security protocol of the first node or device or the adjacent nodes or devices. In this regard, the system may be configured to use machine learning techniques to identify which changes to be made to the network security protocols for the adjacent nodes. In doing so, the machine learning engine 262 of the self-clustering system 200 may receive real-time status information from all nodes on the network, and utilize their traffic patterns, device characteristics, and location within the network topology to identify adjacent nodes which are similar to the first node or device.

To this end, the system may be configured to initiate a machine learning model on the information associated with the change in the network security protocol associated with the first node or device. As described herein, a machine learning model may refer to a mathematical model generated by machine learning algorithms based on sample data, known as training data, to make predictions or decisions without being explicitly programmed to do so. Using the machine learning model, the system may be configured to classify the change in the network security protocol associated with the first node into predetermined classes, where each class is associated with preset changes to security controls associated with the network security protocols. Based on the classification, the system may be configured to determine the first set of changes to the network security protocols for the one or more adjacent nodes from preset changes associated with that class, and automatically implement the set of changes to the network security protocols of the one or more adjacent nodes or devices.

In some embodiments, the set of changes to the network security protocols of the one or more adjacent nodes or devices may comprise clustering the nodes to behave in the same manner with respect to the identified security issue. In some embodiments, the cluster may act in concert to share data that may be helpful in determining additional issues. For instance, in some circumstances, a security issue may be identifiable using two or more different perspectives of the network topology. In this way, the first node or device and the adjacent nodes or devices which are clustered together by nature of the same set of changes to the network security protocols may combine their real-time network and device connection data in order to form a composite picture of identified security issues.

In some embodiments, the predetermined classes may be labelled and defined based on at least a security control type. For example, Class Label A may include preset changes to network security protocols that are intended to prevent an incident from occurring, i.e., preventative controls, Class Label B may include preset changes to network security protocols that are intended to identify and characterize an incident in progress, i.e., detective controls, Class Label C may include preset changes to network security protocols that are intended to limit the extent of any damage cause by the incident, i.e., corrective controls, and so on. Thus, when the machine learning model classifies the change in the network security protocol associated with the first node, it may classify the change into one or more classes and assign a degree of membership (in the form of a percentage or equivalent) to each class. Based on the class and the degree of membership, the system may be configured to choose the first set of changes to the network security protocols for the one or more adjacent nodes from the preset changes to network security protocols associated with each class.

To generate the machine learning model capable of classifying the change in the network security protocol associated with the first node, the machine learning model has to be trained using past changes to the network security protocols in the nodes and corresponding responsive changes to the network security protocols in their adjacent nodes with first degree of separation. Accordingly, the system may be configured to retrieve, from a data repository, changes detected to the network security protocols associated with one or more nodes in the past and the responsive sets of changes to the network security protocols of their adjacent nodes with first degree of separation. The changes detected to the network security protocols associated with one or more nodes in the past and the responsive sets of changes to the network security protocols of their adjacent nodes with first degree of separation form the training dataset for the machine learning model. Next, the system may be configured to train the machine learning using the training dataset by initiating the machine learning algorithm on the training dataset. Once trained, the system may be configured to determine classification parameters for the machine learning model that are then used to process unseen changes in the network security protocol of a particular node to identify a particular set of changes to the network security protocols in its adjacent nodes with a first degree of separation.

Next, as shown in block 410, the process flow includes automatically implementing the first set of changes to the network security protocols of the one or more adjacent nodes or devices, forming a node cluster. Once a node cluster is formed, clustered nodes continue sharing network traffic and analysis data between the nodes and devices in the cluster in order to determine further changes that may be required. In some embodiments, implementing the first set of changes may include implementing specific changes in the status of the associated security controls of the nodes within the node cluster. In some embodiments, should the change in the network security protocol of the first node revert to its initial state at some point in the future, the system may be configured to automatically dismantle the node cluster status, and revert the first set of changes to the network security protocols of the one or more adjacent nodes with the first degree of separation to their initial state in response. In this instance, a notification or confirmation message may be automatically forwarded to a network administrator or user of the self-clustering system 200 in order to confirm that the security issue has abated, and the clustered status of the node cluster has been reversed to a normal, non-clustered state.

In some embodiments, in addition to determining the first set of changes to the network security protocols of the one or more adjacent nodes with the first degree of separation from the first node, the system may be configured to determine a second set of changes to the network security protocols of the one or more adjacent nodes with the second degree of separation from the first node in a similar way. Accordingly, the system may be configured to identify one or more adjacent nodes with a second degree of separation from the first node in response to detecting the change. In response, the system may be configured to determine a second set of changes to the network security protocols for the one or more adjacent nodes with the second degree of separation from the first node based on at least the information associated with the change in the network security protocol of the first node and the first set of changes implemented to the network security protocols of the one or more adjacent nodes with the first degree of separation from the first node. In response, the system may be configured to automatically implement the second set of changes to the network security protocols of the one or more adjacent nodes with the second degree of separation from the first node.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for self-clustering edge computing, the system comprising:
   at least one non-transitory storage device; and
   at least one processing device coupled to the at least one non-transitory storage device, wherein the at least one processing device is configured to:
   detect, using a node analysis engine, a change in a network security protocol associated with a first node or device within a network environment;
   extract information associated with the change in the network security protocol associated with the first node or device;
   transmit instructions to the first node or device to broadcast the change and underlying security issue to one or more adjacent nodes or devices;
   determine a first set of changes to the network security protocols for the one or more adjacent nodes or devices based on device similarity and network topology distance between the first node or device and the one or more adjacent nodes or devices;
   automatically implement the first set of changes to the network security protocols of the one or more adjacent nodes or devices;
   initiate a machine learning model on the information associated with the change in the network security protocol associated with the first node or device;
   classify, using the machine learning model, the change in the network security protocol associated with the first node into one or more classes;
   retrieve one or more preset changes to the network security protocols associated with the one or more classes; and
   determine the first set of changes to the network security protocols for the one or more adjacent nodes or devices from the one or more preset changes.

2. The system of claim 1, wherein adjacent nodes or devices further comprise nodes or devices which are one degree of separation from the first node or device.

3. The system of claim 1, wherein adjacent nodes or devices further comprise nodes or devices which are a same degree of separation from public devices as the first node or device.

4. The system of claim 1, the first set of changes to the network security protocols of the one or more adjacent nodes or devices causes the one or more adjacent nodes or devices to begin sharing real-time data analytics information with the first node or device.

5. The system of claim 4, further configured to implement a second set of changes on the first node or device and the adjacent nodes or devices contemporaneously based on changes in the real-time data analytics information.

6. The system of claim 1, wherein the at least one processing device is further configured to:
   identify one or more adjacent nodes or devices with a second degree of separation from the first node or device in response to detecting the change;
   determine a second set of changes to the network security protocols for the one or more adjacent nodes or devices with the second degree of separation from the first node or device based on at least the information associated with the change in the network security protocol of the first node or device and the first set of changes implemented to the network security protocols of the one or more adjacent nodes or devices with the first degree of separation from the first node or device; and
   automatically implement the second set of changes to the network security protocols of the one or more adjacent nodes or devices with the second degree of separation from the first node.

7. A computer program product for self-clustering edge computing, the computer program product comprising a non-transitory computer-readable medium comprising code causing a first apparatus to:
   detect, using a node analysis engine, a change in a network security protocol associated with a first node or device within a network environment;
   extract information associated with the change in the network security protocol associated with the first node or device;
   transmit instructions to the first node or device to broadcast the change and underlying security issue to one or more adjacent nodes or devices;
   determine a first set of changes to the network security protocols for the one or more adjacent nodes or devices based on device similarity and network topology distance between the first node or device and the one or more adjacent nodes or devices;
   automatically implement the first set of changes to the network security protocols of the one or more adjacent nodes or devices;
   initiate a machine learning model on the information associated with the change in the network security protocol associated with the first node or device;
   classify, using the machine learning model, the change in the network security protocol associated with the first node into one or more classes;
   retrieve one or more preset changes to the network security protocols associated with the one or more classes; and
determine the first set of changes to the network security protocols for the one or more adjacent nodes or devices from the one or more preset changes.

8. The computer program product of claim 7, wherein adjacent nodes or devices further comprise nodes or devices which are one degree of separation from the first node or device.

9. The computer program product of claim 7, wherein adjacent nodes or devices further comprise nodes or devices which are a same degree of separation from public devices as the first node or device.

10. The computer program product of claim 7, wherein the first set of changes to the network security protocols of the one or more adjacent nodes or devices causes the one or more adjacent nodes or devices to begin sharing real-time data analytics information with the first node or device.

11. The computer program product of claim 10, further configured to implement a second set of changes on the first node or device and the adjacent nodes or devices contemporaneously based on changes in the real-time data analytics information.

12. The computer program product of claim 7, wherein the at least one processing device is further configured to:
identify one or more adjacent nodes or devices with a second degree of separation from the first node or device in response to detecting the change;
determine a second set of changes to the network security protocols for the one or more adjacent nodes or devices with the second degree of separation from the first node or device based on at least the information associated with the change in the network security protocol of the first node or device and the first set of changes implemented to the network security protocols of the one or more adjacent nodes or devices with the first degree of separation from the first node or device; and
automatically implement the second set of changes to the network security protocols of the one or more adjacent nodes or devices with the second degree of separation from the first node.

13. A method for self-clustering edge computing, the method comprising:
detect, using a node analysis engine, a change in a network security protocol associated with a first node within a distributed network;
detect, using a node analysis engine, a change in a network security protocol associated with a first node or device within a network environment;
extract information associated with the change in the network security protocol associated with the first node or device;
transmit instructions to the first node or device to broadcast the change and underlying security issue to one or more adjacent nodes or devices;
determine a first set of changes to the network security protocols for the one or more adjacent nodes or devices based on device similarity and network topology distance between the first node or device and the one or more adjacent nodes or devices;
automatically implement the first set of changes to the network security protocols of the one or more adjacent nodes or devices;
initiate a machine learning model on the information associated with the change in the network security protocol associated with the first node or device;
classify, using the machine learning model, the change in the network security protocol associated with the first node into one or more classes;
retrieve one or more preset changes to the network security protocols associated with the one or more classes; and
determine the first set of changes to the network security protocols for the one or more adjacent nodes or devices from the one or more preset changes.

14. The method of claim 13, wherein adjacent nodes or devices further comprise nodes or devices which are one degree of separation from the first node or device.

15. The method of claim 13, wherein the first set of changes to the network security protocols of the one or more adjacent nodes or devices causes the one or more adjacent nodes or devices to begin sharing real-time data analytics information with the first node or device.

16. The method of claim 15, further configured to implement a second set of changes on the first node or device and the adjacent nodes or devices contemporaneously based on changes in the real-time data analytics information.

17. The method of claim 13, wherein adjacent nodes or devices further comprise nodes or devices which are a same degree of separation from public devices as the first node or device.

* * * * *